United States Patent [19]

Jones

[11] Patent Number: 5,126,156

[45] Date of Patent: Jun. 30, 1992

[54] METHOD OF PREPARING AND STORING A FREE FLOWING, FROZEN ALIMENTARY DAIRY PRODUCT

[76] Inventor: Curt D. Jones, 571 New Circle Rd., NE., Lexington, Ky. 40505

[21] Appl. No.: 762,072

[22] Filed: Sep. 18, 1991

Related U.S. Application Data

[63] Continuation of Ser. No. 320,066, Mar. 6, 1989, abandoned.

[51] Int. Cl.$^5$ ............................................. A23G 9/04
[52] U.S. Cl. .................................... 426/418; 426/515; 426/524; 426/565
[58] Field of Search ............... 426/393, 524, 515, 418, 426/565; 62/63, 78

[56] References Cited

U.S. PATENT DOCUMENTS

| | | |
|---|---|---|
| 3,162,019 | 12/1964 | Porter et al. |
| 3,228,838 | 1/1966 | Rinfret et al. .............. 62/78 |
| 4,251,547 | 2/1981 | Liggett ....................... 426/1 |
| 4,655,047 | 4/1987 | Temple et al. ............. 62/64 |
| 4,687,672 | 8/1987 | Vitkovsky ................. 426/524 |
| 4,704,873 | 10/1987 | Imaike et al. ............. 62/64 |

FOREIGN PATENT DOCUMENTS 964921 3/1975 Canada.
1376972 12/1974 United Kingdom.

Primary Examiner—Donald E. Czaja
Assistant Examiner—Evan Federman
Attorney, Agent, or Firm—King & Schickli

[57] ABSTRACT

A method for preparing and storing a free-flowing, frozen alimentary dairy product includes the steps of preparing an alimentary composition for freezing and slowly dripping the composition into a freezing chamber. Next is rapidly freezing the dripping composition into small beads so as to minimize ice crystal formation. The method continues with the storing of the beads for extended periods of time at a temperature at least as low as −20° F. This maintains the free-flowing characteristic. Consumption enjoyment of the beads is increased by bringing the beads up to a temperature above −20° F., preferably within a range of −10° to −20° F., prior to serving.

13 Claims, 1 Drawing Sheet

METHOD OF PREPARING AND STORING A FREE FLOWING, FROZEN ALIMENTARY DAIRY PRODUCT

This is a continuation of application Ser. No. 320,066, filed Mar. 6, 1989, now abandoned.

BACKGROUND OF THE INVENTION

The present invention relates generally to the field of frozen dairy products and, more particularly, to a unique method of preparing, storing and serving a free-flowing, frozen dairy product such as ice cream or yogurt.

Frozen ice cream and yogurt sales have grown dramatically over recent years. This growth has been achieved primarily through extensive advertising and mass marketing efforts. In particular, dairy cooperatives have been promoting ice cream and yogurt as health foods. In addition, a number of new and developing ice cream parlor franchises have conducted aggressive advertising campaigns in order to firmly establish themselves in the marketplace.

If the rising trend in sales is to continue in today's competive marketplace, however, it is clear that a more sophisticated product must be developed to attract discriminating consumers. A need is therefore identified for such a product.

SUMMARY OF THE INVENTION

Accordingly, a primary object of the present invention is to provide a sophisticated, frozen dairy product having improved flavor and mass consumer appeal.

Another object of the present invention is to provide a free-flowing, frozen alimentary dairy product which is served at a relatively low temperature so as to be more refreshing and exhilarating to the average consumer.

Still another object of the present invention is to provide a method of preparing a free-flowing, frozen alimentary dairy product which is quickly frozen so as to prevent the formation of large ice crystals and thereby provide a smoother product with better flavor.

Yet another object of the present invention is to provide a method of storing such a dairy product so as to retain its fresh taste and free-flowing character when served to consumers at a temperature at which it may be enjoyed.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and the combinations particularly pointed out in the appended claims.

To achieve the foregoing and other objects, and in accordance with the purposes of the present invention as described herein, an improved method is provided for preparing and storing a free-flowing, frozen alimentary dairy product. The initial step of the method is the preparing of an alimentary composition for freezing. Preferably, the composition is dairy-based but, of course, may include sugar and other additives for flavor. Once prepared, the method includes a step of slowly dripping the alimentary composition into a freezing chamber.

More specifically, the alimentary composition is added into a tray as by pouring from a pitcher or, more preferably pumping from a supply container. A pump adapted for this purpose is manufactured by Cole-Parmer Instrument Company under the trademark MASTERFLEX. The tray includes a series of apertures through which the composition drips into a freezing chamber. Preferably, the apertures have a diameter between substantially 0.125 and 0.3125 inches. Of course, the size of the apertures may be varied to provide specific sized droplets depending upon the thickness of the composition. As the droplets fall through the freezing chamber, rapid, almost simultaneous, freezing takes place and small beads of frozen product are formed.

Preferably, the freezing chamber is maintained at a temperature below substantially $-260°$ F. This can be accomplished, for example, by utilizing liquid nitrogen as a refrigerant. More specifically, the droplets fall downwardly in the freezing chamber through the vaporized refrigerant until they actually contact the liquid refrigerant in the bottom of the chamber. This procedure allows the maximum extraction of available refrigeration from the liquid nitrogen. Advantageously, the rapid freezing that results leads to the formation of smaller ice crystals in the product. Consequently, the product is smoother, creamier and exhibits better flavor. These characteristics, of course, serve to increase the consumer appeal of the product.

After the frozen beads of product are formed, the method proceeds with the step of collecting the beads from the freezing chamber. This may be accomplished by utilizing an auger. More specifically, the auger may be positioned at an angle of approximately 45° with respect to the horizontal. The auger may also include flights having a diameter of substantially 1.5–3.5 inches. When such an auger is rotated at substantially 10–100 revolutions per minute depending on the size of the flights, the individual frozen beads may be recovered with a minimum loss of refrigerant from the freezing chamber. This, of course, serves to benefit overall processing efficiency.

Next, is the step of sifting the beads that are collected from the freezing chamber. More specifically, the beads are placed in a sieve which is shaken so that beads having a diameter greater than substantially 2 mm are recovered for further processing and packaging. All other smaller beads are melted and reprocessed as described above or used in specific other products that require or can use the tiny frozen beads.

The large beads, between approximately 10 mm and 2 mm in diameter, recovered following the sifting step are placed within a container. This container is maintained open for a sufficient period of time, such as, for example, 1 to 10 minutes, to allow any residual refrigerant retained in or on the beads during freezing to vaporize. Following this, the container is sealed for storage. The container is then placed in a freezer. The temperature within the freezer is maintained at least as low as $-20°$ F. and, preferably, between $-30°$ and $-40°$ F., if the product is to be stored for periods of greater than approximately 30 hours. This is necessary to ensure that the individual beads remain free-flowing and that no large ice crystals are formed during thaw/refrigeration cycles.

Prior to serving the product for consumption, it is necessary to bring the beads to a temperature $-20°$ F. or above. If this is not done, the beads are too cold for some individuals to enjoy. More preferably, one method of serving the product includes a step of maintaining the beads at a temperature of substantially −15° F. for no longer than approximately 30 hours prior to serving. If maintained at this or a warmer temperature for a longer period of time, the beads become tacky and begin sticking together. Thus, the unique free-flowing characteristic is lost and with it, some of the consumer appeal as well. As such, storage at a temperature of −15° F. for longer than 30 hours, is to be avoided. For certain compositions, however, it should be recognized that the critical time may be as short as ten to twelve hours.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other, different embodiments, and its several details are capable of modifications in various, obvious aspects all without departing from the invention. Accordingly, the drawing and description will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing.

DETAILED DESCRIPTION OF THE INVENTION

Figure 1:
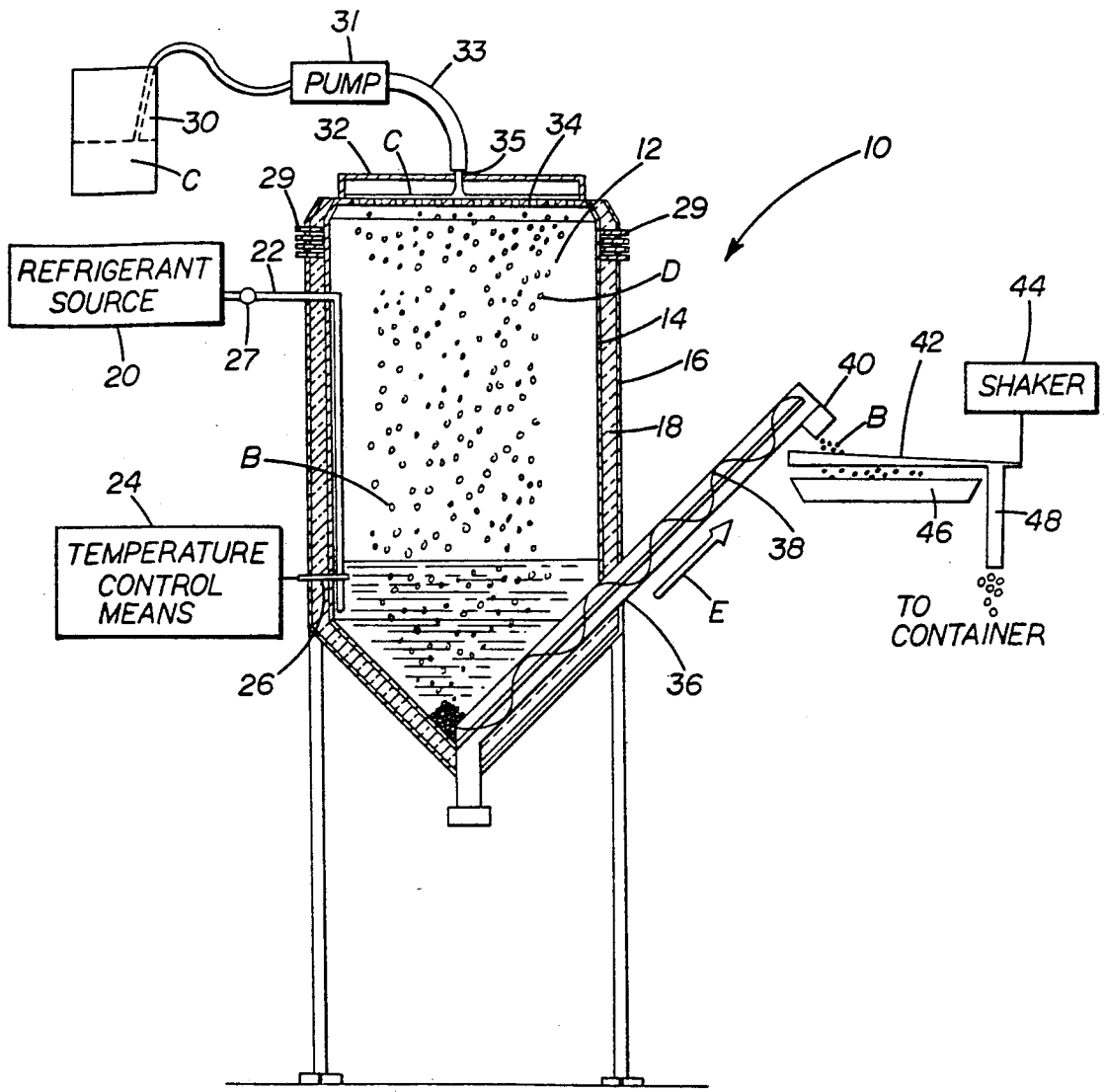
FIG. 1 is a partially schematic cross-sectional view of an apparatus for preparing the free-flowing, frozen alimentary dairy product in accordance with the method of the present invention.

Reference is now made to FIG. 1 showing an apparatus 10 that may be utilized to produce free-flowing, frozen alimentary dairy products in accordance with the method of the present invention. It should be recognized that this apparatus 10 is merely being described as an example of one type of apparatus designed for this purpose. Other designs may, of course, be utilized in accordance with the present method to produce the free-flowing, frozen alimentary dairy product.

As shown, the apparatus 10 includes a freezing chamber 12 having an inner wall 14 and outer wall 16. Preferably, both the walls are constructed of stainless steel to provide both strength and corrosion resistance. A thick layer of thermal insulating material 18 is provided between the walls to improve the efficiency of the freezing chamber by reducing the thermal transfer through the walls 14, 16 between the interior of the chamber 12 and the ambient environment.

The chamber 12 is chilled by the direct addition of refrigerant from a refrigerant source 20 through the delivery line 22. A number of different refrigerants can be utilized although liquid nitrogen is preferred. This material is readily available, relatively inexpensive and relatively inert to food products. It is also sufficiently cold to provide for relatively rapid freezing of the product. As such, it is particularly adapted for utilization in the processing of free-flowing, alimentary dairy products in accordance with the present invention.

The temperature of the freezing chamber as well as the level of liquid refrigerant is maintained within a specified range through the utilization of a temperature control means 24 such as a thermostat as is known in the art. More specifically, the temperature control means 24 may be connected to a thermocouple 26. The thermocouple 26 is positioned to extend into the freezing chamber 12 at a selected height between, for example, 4 to 18 inches above the bottom of the chamber to sense the temperature within the chamber. Where, for example, liquid nitrogen is utilized as the refrigerant, the thermostat is set to maintain the temperature within the chamber 12 at the thermocouple 26 between approximately −300° to −320° F. The positioning of the thermocouple 26 some 4 to 18 inches above the bottom of the chamber 12 provides the necessary reservoir of refrigerant to quick freeze the droplets of the alimentary composition. The ultra-low temperature of the refrigerant limits the formation of ice crystals in the product as it is frozen. Advantageously, by reducing the overall size of the ice crystals being formed, the resulting frozen product has a richer, creamier texture and exhibits a better, overall flavor.

For example, when the temperature within the chamber 12 at the thermocouple 26 rises above the set range of operation (i.e. −300° to −320° F.), this is an indication that the level of liquid refrigerant has fallen below the thermocouple. As a result of the operation of the temperature control means 24, a valve 27 is then opened to allow delivery of liquid nitrogen from the source 20 through the line 22 to the chamber 12. Once the liquid refrigerant level within the chamber 12 reaches and contacts the thermocouple 26, the desired level of liquid refrigerant for freezing the composition is restored and the valve 27 is closed.

Of course, alternative temperature or level control systems may be utilized. For example, a number of thermocouples 26 may be positioned at various heights within the chamber 12. The thermocouple 26 at the desired liquid refrigerant level to be maintained is then selected and utilized as described above. In another alternative, a liquid nitrogen level controller such as manufactured and marketed by Minnesota Valley Engineering, Inc. under the trademark CRYO-MED (Model LL-450) may be utilized.

Vents 29 are provided in the walls 14, 16 near the top of the freezing chamber 12. These vents 29 serve to release rising nitrogen vapor from the chamber 12 and prevent any build-up in pressure in the chamber or any excess lowering of temperature near the top such that the dropper system is frozen over time. This exhaust can be controlled manually by venting through an exit pipe which is controlled by a damper. Alternatively, the exhaust gas can be collected under vacuum by the use of an exhaust fan. This cold vapor can be routed to other parts of the process where cold vapors can be utilized such as in storage spaces or with packaging machines.

The first step of the method of the present invention relates to the preparing of an alimentary composition for freezing. Typically, the composition will be dairy based and includes such ingredients as cream, milk, butter and/or eggs. Additional ingredients could include sugar, fruit extracts or some other flavoring component, such as vanilla extract.

After preparing the composition comes the step of slowly dripping the composition into the freezing chamber 12. This may be accomplished in a number of ways. For example, as shown in FIG. 1, the composition C may be pumped from a supply container 30 into a dropper system including a tray 32 positioned across the upper end of the freezing chamber 12. More specifically, the composition is pumped by pump 31 through the tube 33 so as to be delivered through an inlet 35 in the top of the tray that closes the tray to prevent any residual dirt or dust in the air from falling into the composition. The bottom of the tray 32 includes a series of apertures 34 through which the composition drips into the freezing chamber 12. Preferably, the apertures have a diameter of between substantially 0.125 and 0.3125 inches so as to provide the desired size droplets of composition for freezing into beads. Of course, the size of the droplets and rate of flow will be determined not only by the size of the holes, but the thickness of the composition and in some cases the thickness of the tray.

As the droplets D of composition fall downwardly in the freezing chamber, they contact cold nitrogen gas rapidly vaporizing from the pool of liquid nitrogen P at the bottom of the chamber. As a result of the temperature within the range of $-260°$ to $-320°$ F. (for liquid $N_2$), rapid freezing of the droplets of composition occurs. The small beads B that are produced contain only relatively small ice crystals. The beads B have a smooth, spherical appearance.

An auger 36 for collecting the beads extends into the bottom of the chamber 12. As shown, the auger is positioned at an angle of approximately 45° with respect to the horizontal. Preferably, the auger includes flights having a diameter of substantially 1.5" to 3.5". By rotating such an auger at substantially 10-100 revolutions per minute, it is possible to complete collecting of the beads from the freezing chamber.

More specifically, as the auger is rotated, the beads B are drawn upwardly in the direction of action arrow E on the flights 38. Liquid refrigerant is, however, not withdrawn from the freezing chamber as sufficient space exists between the flights 38 and the walls of the auger 36 so as to allow the liquid nitrogen to drain back to the pool P. This space is, of course, not large enough to allow the passage of the beads B.

Once the beads B reach the top of the auger 36, they are deposited by means of a chute 40 onto a sieve 42. The sieve 42 is connected to a shaking apparatus 44 as is known in the art. This apparatus 44 serves to vibrate the beads B on the sieve 42. Thus, sifting of the beads B occurs with the relatively large beads having a diameter of, for example, approximately 2 mm or larger remaining on the surface of the sieve while the smaller beads and fragmented portions of broken beads fall through the sieve into the collecting pan 46. That material collected in the pan 46 may, of course, be melted and reprocessed by mixing back in with the composition C that is added to the tray 32 as described above.

The larger beads flow over the sieve to a discharge chute 48 where they are deposited into a container (not shown). This container is maintained open for substantially 1-10 minutes in order to allow any residual nitrogen refrigerant retained in or on the surface of the beads to vaporize. Then the container is sealed and placed in a freezer for storage.

In order to prevent the beads B from sticking together during storage and thereby maintain their free-flowing character, they must be maintained at a relatively low temperature. More specifically, if the beads B are to be stored for greater than a period of approximately 30 hours, they should be stored in the refrigerator at a temperature of at least as low as $-20°$ F. More preferably, the beads are stored at a temperature between $-30°$ and $-40°$ F.

Alternatively, if the beads B are to be consumed within a 30-hour period (or shorter period of 10-12 hours for certain compositions), they are to be stored in the freezer at a temperature of $-20°$ F. or above. More preferably, the beads are brought to a temperature between substantially $-10°$ and $-20°$ F. with $-15°$ F. providing the best results. Warmer temperatures may result in the beads sticking together and the product losing its unique free-flowing property which adds to its consumer appeal. When served at a colder temperature, many individuals find that the product is too cold to be fully enjoyed.

In summary, numerous benefits have been described which result from employing the concepts of the present invention. In particular, the method of the present invention allows the preparation, storing and serving of a unique, free-flowing, frozen alimentary dairy product. Because the product is quick frozen, it is smoother and creamier and provides a full-bodied flavor. Advantageously, the resulting product has a certain sophistication that appeals to today's discriminating consumers who want something special.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method of preparing and storing a free-flowing, frozen alimentary dairy product, comprising the steps of:

preparing an alimentary composition for freezing;

dripping said alimentary composition into a freezing chamber;

freezing said dripping alimentary composition into beads;

storing said beads at a temperature at least as low as $-20°$ F. so as to maintain said beads free-flowing for an extended period of time;

bringing said beads to a temperature between substantially $-10°$ F. and $-20°$ F. prior to serving; and serving said beads for consumption at a temperature between substantially $-10°$ F. and $-20°$ F. so that said beads are free flowing when served.

2. The method as set forth in claim 1, wherein said dripping step includes the step of adding said alimentary composition into a tray having a series of apertures through which said composition drips into said freezing chamber, said apertures having diameters between substantially 0.125 and 0.3125 inches.

3. The method set forth in claim 1, wherein said beads have a diameter between substantially 10 mm and 2 mm.

4. The method set forth in claim 1, further including a step of maintaining said temperature within said freezing chamber below substantially $-260°$ F.

5. The method set forth in claim 1, further including a step of collecting said beads from said freezing chamber by utilizing an auger.

6. The method set forth in claim 5, wherein said auger is positioned at approximately 45° relative to horizontal and includes flights having a diameter of substantially 1.5 to 3.5 inches and said collecting step includes the step of rotating said auger at substantially 10 to 100 revolutions per minute.

7. The method set forth in claim 5, further including a step of sifting beads collected from said freezing chamber.

8. The method set forth in claim 7, further including the steps of recovering beads having a diameter larger than substantially 2 mm during sifting and placing said recovered beads within a container.

9. The method set forth in claim 8, wherein liquid nitrogen is utilized to freeze said alimentary composition and the method further includes the step of maintaining said container open for a sufficient period of time to allow any nitrogen retained in or on said beads during freezing to vaporize.

10. The method set forth in claim 9, further including the step of sealing said container.

11. The method set forth in claim 1, wherein said storing of said beads is at a temperature at least as low as −30° F.

12. The method set forth in claim 1, wherein said storing of said beads is at a temperature of substantially −30° to −40° F.

13. The method set forth in claim 1, wherein said beads are brought to a temperature of substantially −15° F. prior to serving.

* * * * *